(12) United States Patent
Peter

(10) Patent No.: US 7,234,758 B2
(45) Date of Patent: Jun. 26, 2007

(54) TRAVEL LOCK FOR VEHICLE SLIDE-OUT

(75) Inventor: Gary D. Peter, Middlebury, IN (US)

(73) Assignee: Actuant Corporation, Glendale, WI (US)

( * ) Notice: Subject to any disclaimer, the term of this patent is extended or adjusted under 35 U.S.C. 154(b) by 218 days.

(21) Appl. No.: 11/039,015

(22) Filed: Jan. 20, 2005

(65) Prior Publication Data

US 2005/0161963 A1   Jul. 28, 2005

Related U.S. Application Data

(60) Provisional application No. 60/538,378, filed on Jan. 22, 2004.

(51) Int. Cl.
*B60P 3/34* (2006.01)

(52) U.S. Cl. .................. 296/165; 296/171; 296/175

(58) Field of Classification Search ................ 296/165, 296/167, 171, 172, 173, 175, 176, 26.12, 296/26.13; 52/67

See application file for complete search history.

(56) References Cited

U.S. PATENT DOCUMENTS

| | | | | |
|---|---|---|---|---|
| 5,732,839 A | * | 3/1998 | Schimmang et al. | .... 296/26.13 |
| 6,048,016 A | * | 4/2000 | Futrell et al. | ............ 296/26.13 |
| 6,094,870 A | * | 8/2000 | Stacy | .......................... 296/175 |
| 6,186,692 B1 | | 2/2001 | Hanser et al. | |
| 6,224,126 B1 | * | 5/2001 | Martin et al. | ............ 296/26.12 |
| 6,227,607 B1 | * | 5/2001 | Dewald et al. | .......... 296/26.13 |
| 6,354,646 B1 | * | 3/2002 | McManus et al. | ....... 296/26.13 |
| 2006/0125265 A1 | * | 6/2006 | Kunz | ...................... 296/26.01 |

\* cited by examiner

*Primary Examiner*—Jason Morrow
(74) *Attorney, Agent, or Firm*—Quarles & Brady LLP

(57) ABSTRACT

A gear operated pivoting travel lock secures a slide-out section of a vehicle in a retracted position. The travel lock includes a gear box, containing two mating worm gears, that mounts to a wall of the slide-out section. The drive gear is mounted at the end of an operating member and the driven gear is mounted to an axle. Two pivot arms are mounted at the ends of the axle. Turning the operating member, preferably by a handle member, rotates the drive gear to mesh with the driven gear. As the driven gear rotates, the pivot arms swing out from a collapsed position to an engaged position. When the slide-out section is retracted within the vehicle, a pressure pad at the end of the pivot arms clamps against an interior surface of the vehicle wall. When the travel lock is collapsed the slide-out section can be moved between the retracted and extended positions.

17 Claims, 5 Drawing Sheets

TRAVEL LOCK FOR VEHICLE SLIDE-OUT

CROSS-REFERENCE TO RELATED APPLICATION

This application claims benefit to U.S. Provisional Patent Application No. 60/538,378 filed Jan. 22, 2004.

STATEMENT OF FEDERALLY SPONSORED RESEARCH OR DEVELOPMENT

Not applicable.

BACKGROUND OF THE INVENTION

1. Technical Field

The present invention relates to vehicles having slide-out sections, and in particular to devices for securing the slide-out sections when retracted.

2. Description of the Related Art

Vehicles (including self-powered vehicles and non-powered trailers) having interiors with living space, such as recreational vehicles (RVs), are well-known. In order to increase the interior living space available in such vehicles it is known to have slide-out sections, such as rooms and closets, that can be retracted during transit and extended when the vehicle is stationary and intended to be occupied. To use the slide-out section, the vehicle is first parked and leveled and then the slide-out section is extended by a manual or powered slide-out assembly. With the slide-out section extended outward from the vehicle, the interior space can be significantly increased.

When the slide-out section is retracted and the vehicle is in transit, the slide-out section must be securely retained so as not to move around while the vehicle is in transit. If not, the slide-out room can move considerably with respect to the rest of the vehicle during transit, for example, from riding over bumps, taking high-speed turns or making evasive maneuvers with the vehicle. In extreme cases, this can result in the slide-out section actually sliding away, or extending, from the vehicle during transit.

Another problem is forming a tight seal between the slide-out section and the vehicle, particularly when the slide-out section is retracted, to keep out rain, insects and other foreign bodies. The sliding mechanism is often not sufficient to compress the gaskets or other seals around the vehicle opening to adequately seal off the interior, especially nearer to the top of the slide-out room.

Stand alone latching or locking devices, generally known as travel locks, have been devised to address these problems. One such locking device commonly used in the RV slide-out industry is a tension-rod type apparatus. This device uses a spring-loaded telescoping rod disposed between the vehicle's exterior wall and an interior flange of the slide-out section, like a shower curtain rod. The rod puts tension on the slide-out section tending to bias it inward toward the vehicle, or in other words, toward being retracted. This is disadvantageous because it requires one or more separate components that must be stored in a separate location. In addition, the spring tension of the rod may be insufficient to keep the top of the room from tipping out away from the vehicle wall during transit, or to adequately compress the top outside gasket of the slide-out room. Moreover, it is a rather crude solution that is not acceptable in modern RV's.

U.S. Pat. No. 6,186,692 discloses another type of locking mechanism for a slide-out section. Here, a tapered shaft is moved axially in and out of engagement with a split ring that is thereby expanded outward to lock together two structural members of the vehicle and slide-out section. This unit is totally concealed by the structural members and is hydraulically driven, and therefore, it is expensive to make and assemble and is not readily adapted for manual deployment in the event of power loss.

Accordingly, an improved locking device is desired for securing the slide-out section of a vehicle in a retracted position.

SUMMARY OF THE INVENTION

In a vehicle having an exterior wall defining an opening for a slide-out section to move between an extended position and a retracted position, the present invention provides a travel lock for securing the slide-out section in the retracted position relative to the vehicle. The travel lock includes an actuator having an operating member and is mounted to the slide-out section so that the operating member is accessible from an interior of the slide-out section for activating the actuator and thereby pivot a pivot arm from a collapsed position to an engaged position. In the collapsed position, the slide-out section can be moved from the retracted to the extended position. In the engaged position, the pivot arm interferes with movement of the slide-out section from the retracted to the extended position.

In a preferred form, a gear box houses the actuator, which is a mating worm gear arrangement including a drive gear mounted on a shaft of the operating member and a driven gear mounted to an axle which mounts a pair of pivot arms at its ends. The two gears are arranged so that the axle is disposed essentially perpendicular to the shaft of the operating member. Preferably, the driven gear has a pitch diameter at least two times that of the drive gear, for example, the pitch diameter of the drive gear can be about 0.5 inches and the pitch diameter of the driven gear can be about 1.25 inches. A handle is provided to turn the operating member. Rotating the operating member moves the drive gear which meshes with the driven gear to pivot the pivot arms between the collapsed and engaged positions. A pressure pad or plate is pivotally mounted at the free ends of the pivot arms. The pressure pad defines a planar face for engaging an interior surface of the exterior wall of the vehicle. The planar face of the pressure pad is essentially parallel to an interior face of the gear box when the pivot arms are in the collapsed position.

One or more or the travel stops of the present invention can be used to clamp against an interior surface of a fixed vehicle wall so that the slide-out section is retained securely in a retracted position to keep the slide-out section stationary with respect to the rest of the vehicle during transit. The travel stop is compact, light-weight and inexpensive. It can be mounted in a small opening in a wall of the slide-out section for access from the interior of the slide-out section. Its small size makes it inconspicuous to persons inside the slide-out section, especially with the handle removed. Its small size also makes it unnecessary to leave a large unoccupied space around the perimeter of the slide-out section. The travel stop "folds" out of the way so as not to interfere with extension of the slide-out section when desired. The travel stop can be deployed manually with a low strain cranking motion. Moreover, it is readily adapted for power-assisted deployment using an electric motor.

These and still other advantages of the invention will be apparent from the detailed description and drawings. What follows is a description of a preferred embodiment of the present invention. To assess the full scope of the invention the claims should be referenced as the preferred embodiment is not intended as the only embodiment within the scope of the invention.

DETAILED DESCRIPTION OF THE PREFERRED EMBODIMENT

Figure 1:
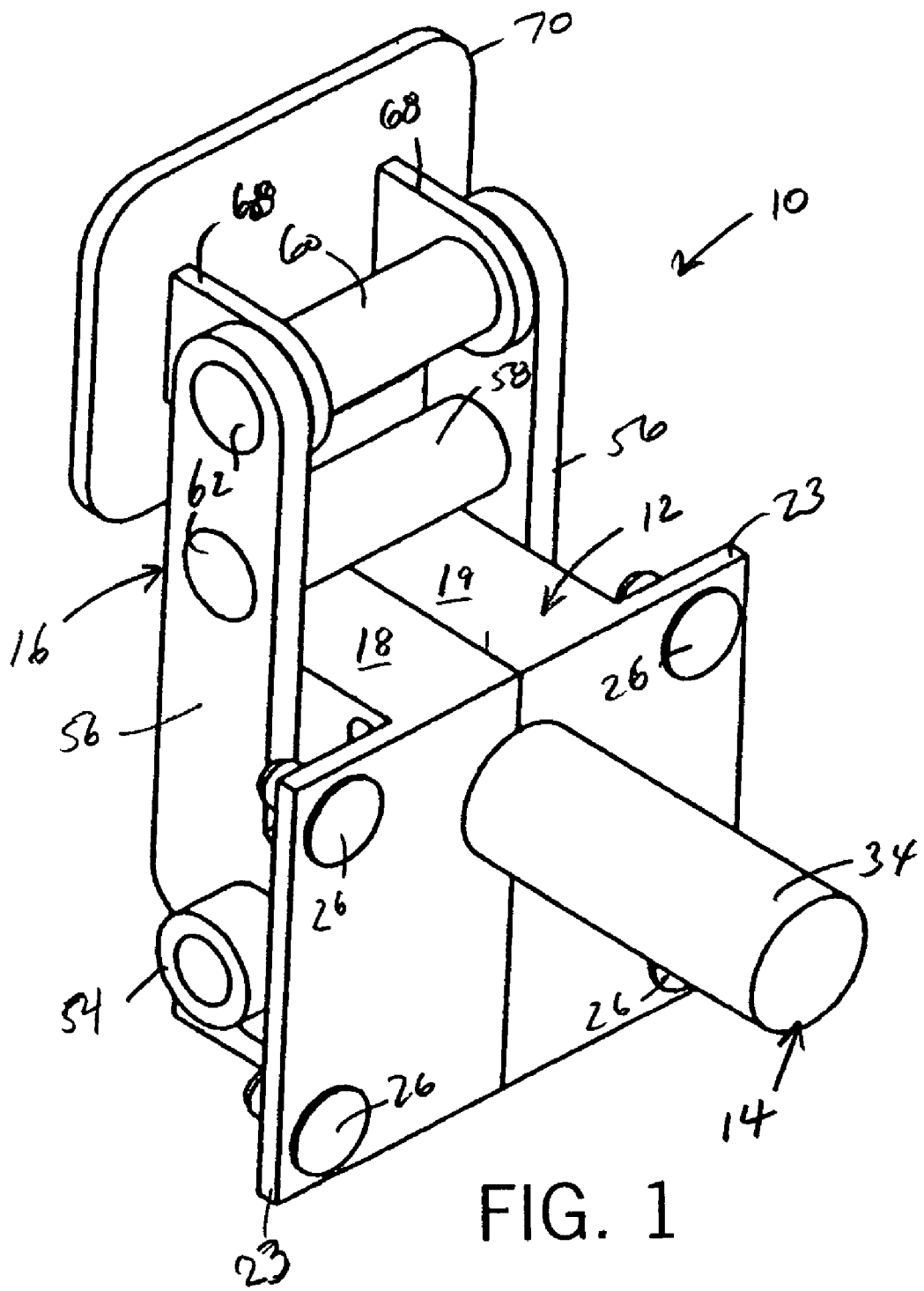
FIG. 1 is a perspective view of a travel lock for a slide-out room of a vehicle according to the present invention.
Figure 2:
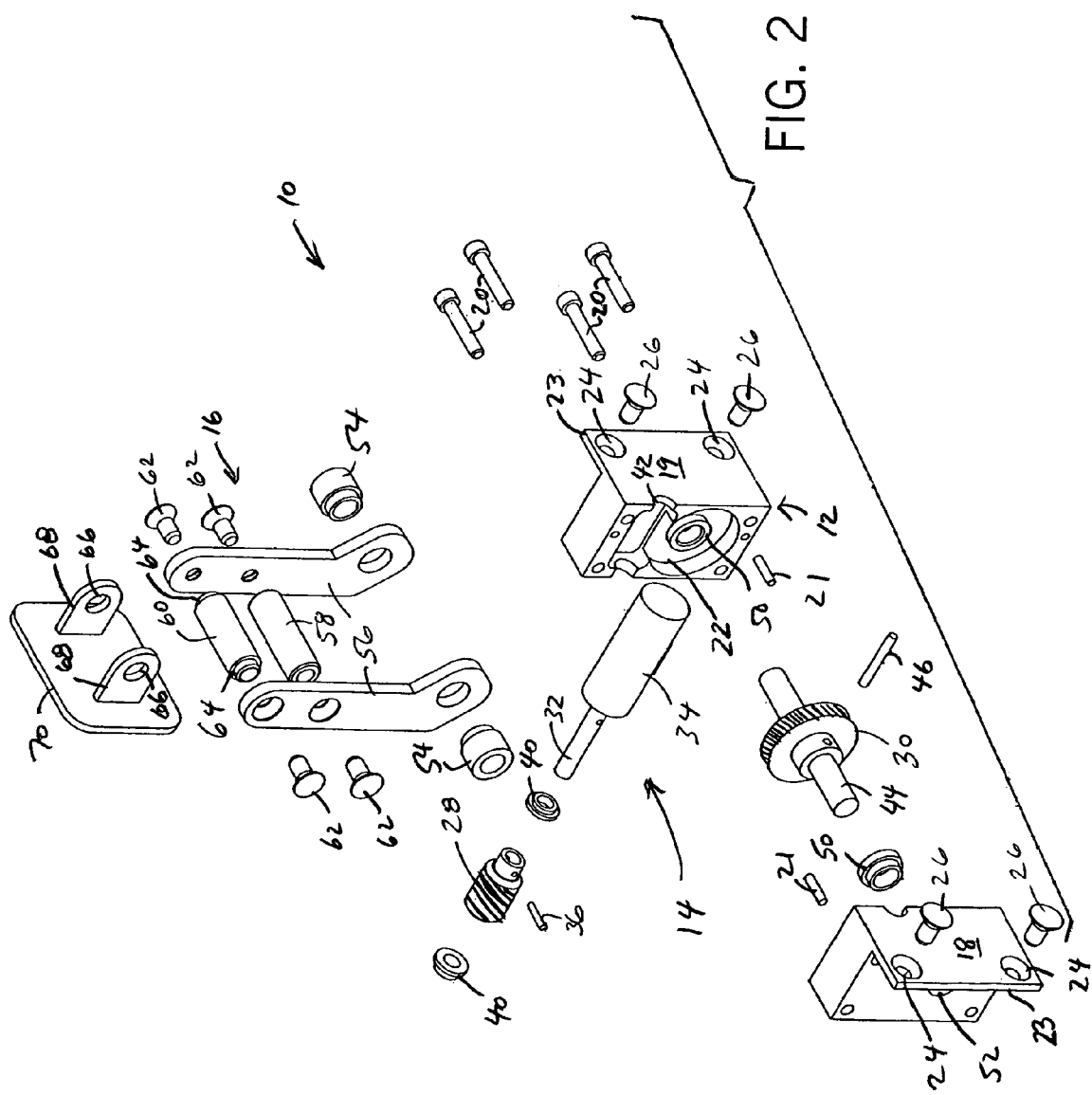
FIG. 2 is an exploded assembly view thereof.
Figure 3:
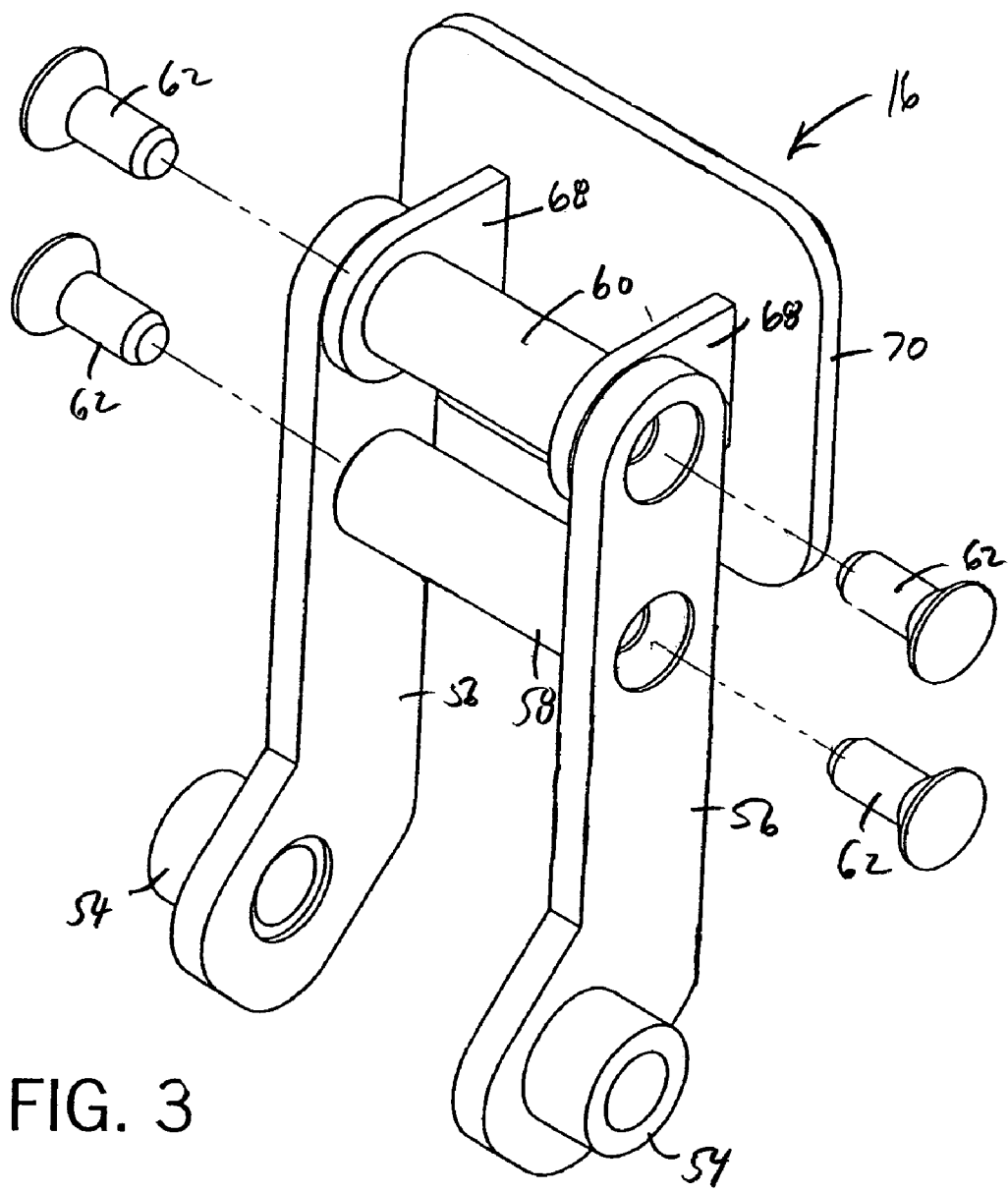
FIG. 3 is a perspective view of a pivot assembly thereof.

Referring to FIGS. 1–3, the travel stop 10 includes a gear box 12 housing an actuator 14 which moves a pivot assembly 16 between collapsed (see FIG. 4) and engaged (see FIG. 5) positions. Specifically, the gear box 12 is of two-piece machined aluminum construction having symmetric left 18 and right 19 parts joined by four bolts 20 and two dowels 21. The mating faces of these parts define pockets or recesses 22 accommodating the actuator 14 and their opposite ends define flanges 23 with bolt holes 24 for cap screws 26 to mount the gear box 12 in a recess in a side wall of a slide-out room. In this case, the stop 10 is inserted into the side wall recess from the interior surface of the side wall (See FIG. 4) and the screws that go through the holes 26 penetrate the interior surface of the slide-out room side wall, with minimal intrusion of the stop 10 into the slide-out room.

Referring to FIG. 2, the actuator 14 is a mating gear arrangement having a drive gear 28 and a driven gear 30. The drive gear 28 slides onto a shaft 32 of an operating member 34 of the actuator 14 and is secured with a roll pin 36 disposed through aligned holes in a collar of the drive gear 28 and the shaft 32. Two bushings 40 are disposed on the shaft 32 adjacent to each side of the drive gear 28. The drive gears 28, 30 and shaft 32 are concealed within the gear box 12, however, the operating member 34 is disposed to the outside of the gear box 12 via opening 42. The driven gear 30 slides onto an axle 44 and is secured thereto via another roll pin 46. Another pair of bushings 50 are mounted onto the axle 44 adjacent to each side of the driven gear 30. The axle 44 is disposed in the gear box 12 so that it is essentially perpendicular to the shaft 32 of the operating member 34 so that the teeth of the drive gear 28 mesh with the teeth of the driven gear 30 so as to turn the axle 44.

The drive gear 28 and the driven gear 30 can be worm gears. The worm gear arrangement provides high gear reduction, and thus low input torque with high holding force, and a one-way drive function in that the gears will rotate easily when turned by the operating member 34 via handle 35 (see FIG. 4) but will resist counter rotation from loading of the pivot assembly 16. The smaller drive gear 28 is the worm and the larger driven gear 30 is the worm gear.

In one preferred form, the worm is preferably hardened steel, single-threaded and right-handed, having a diametral pitch of 24 and a pitch diameter of 0.5 inches. The worm gear is likewise right-handed with the same diametral pitch. The worm gear is preferably bronze and has 30 teeth and a pitch diameter of 1.25 inches. This worm gear arrangement provides a 30:1 gear reduction ratio.

When the gear box 12 is assembled, the ends of the axle 44 protrude through openings 52 in opposite (upper and lower) sides of the gear box 12 to mount the pivot assembly 16 via roll pins (not shown) and collars 54. The pivot assembly 16 is mounted to the axle 44 so that they rotate about the axis of the axle 44 together.

Referring to FIGS. 2 and 3, the pivot assembly 16 is made up of two bent pivot arms 56 on each side of the gear box 12 separated at their free ends by spacers 58 and 60. Both are mounted to the pivot arms 56 by two cap screws 62, however, the ends of spacer 60 define bushings 64 which fit into openings 66 in two mounting brackets 68 of a planar pressure pad 70. The bushings 64 allow the pressure pad 70 to pivot relative to the pivot arms 54.

Figure 4:
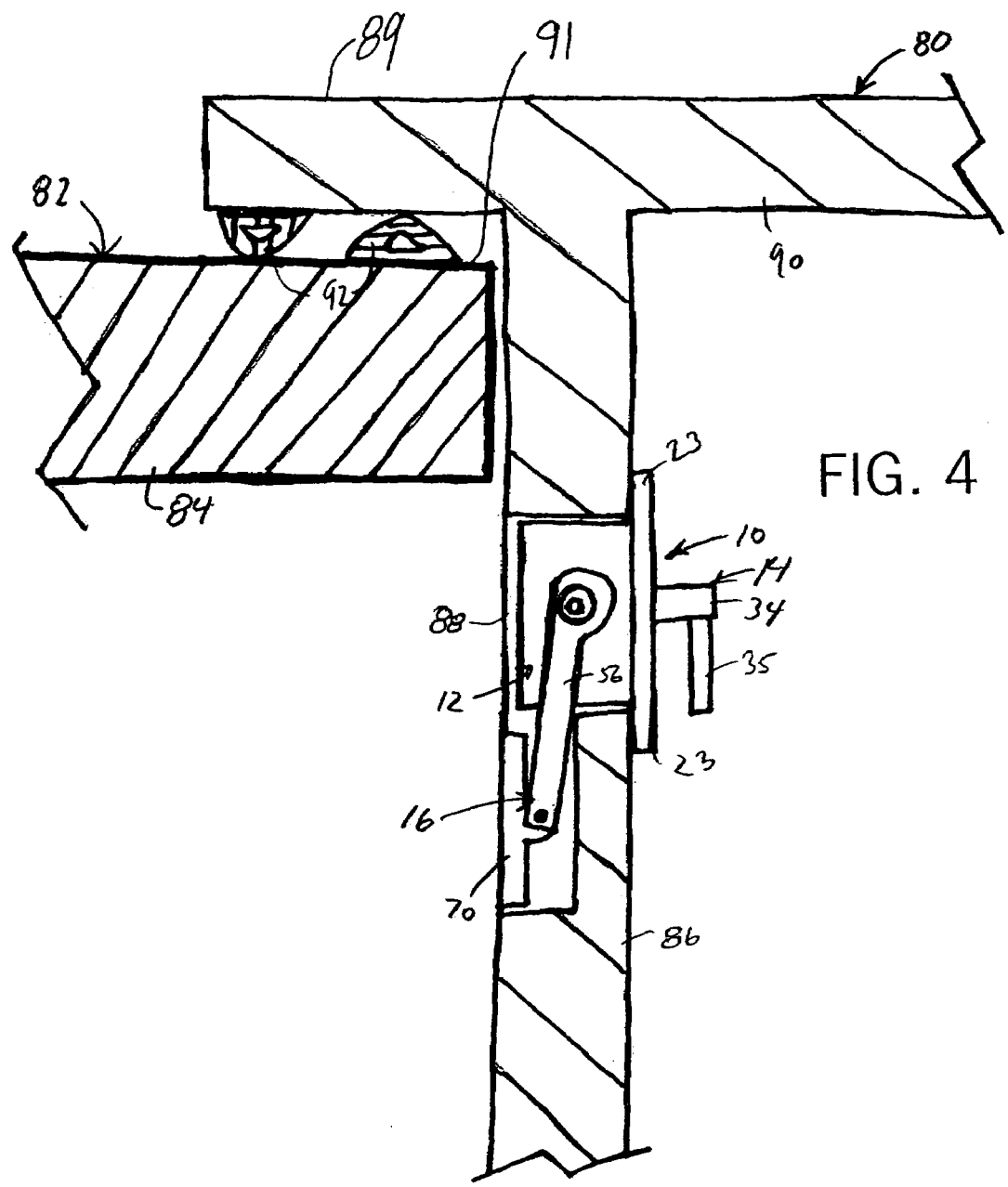
FIG. 4 is a partial sectional top view of the vehicle exterior wall and the slide-out room outside and side walls when in a retracted position showing the travel lock retracted and disposed in the side wall of the slide-out room.
Figure 5:
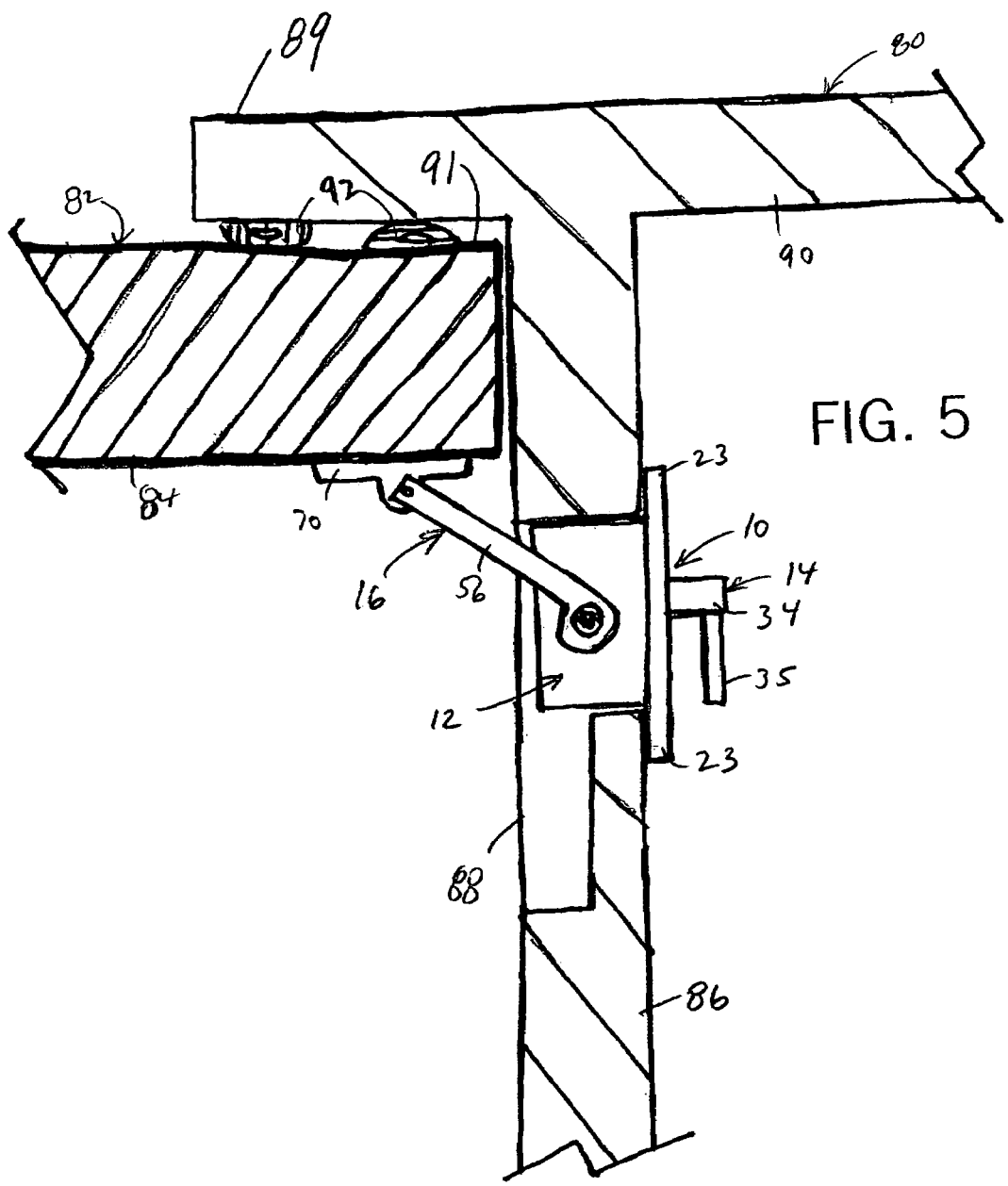
FIG. 5 is a view similar to FIG. 4 albeit with the travel look extended to engage an interior surface of the vehicle exterior wall.

Referring now to FIGS. 4 and 5, the travel stop 10 is preferably mounted to a slide-out section 80 of a vehicle 82, however, it also may be mounted to an exterior wall 84 of the vehicle 82. In an even more preferred form, the travel stop 10 is mounted to an interior side wall 86 of the slide-out section 80, however, it may also be mounted in the ceiling or floor or exterior wall of the slide-out section 80, or the stationary wall of the RV. A small opening 88 is created in the wall 86 and the travel stop 10 is inserted therein. The size of the opening 88 at the interior side of the wall 86 should be large enough for the body of the gear box 12 (and the pressure pad 70) to fit through but smaller than the flanges 23 so that the gear box can be bolted to the wall 86 with cap screws 26 (see FIGS. 1 and 4). The size of the opening at the interior side of the wall 86 can be enlarged so that the pressure pad 70 and the pivot arms 56 can be recessed in the opening 88 when the travel stop 10 is collapsed (as shown in FIG. 4). In this collapsed position, the travel stop 10 is either recessed in the wall 86 (as shown) or retracted sufficiently so that the pivot assembly 16 does not contact the wall 84 of the vehicle 82 so as to obstruct extension of the slide-out section 80.

The travel stop 10 is used to secure the slide-out section 80 when it is retracted into the opening of the vehicle 82 (as shown in FIGS. 4 and 5), such as when the vehicle is moving during travel, to prevent the slide-out section 80 from moving significantly relative to the rest of the vehicle or sliding out unintentionally, and also to compress the gaskets at the top of the slide-out room exterior flange so as to create a seal. To do this, the slide-out section 80 is first retracted into the vehicle 80 (if not already) by a manual or power-assist mechanism of the vehicle's slide-out assembly so that flanges 89 of an exterior wall 90 of the slide-out section 80 overlaps the edges 91 of the opening in the exterior wall 84 of the vehicle 82, as shown in FIG. 4. Then, the actuator 14 is activated by turning the operating member 34 with the handle 35. As the operating member 34 is rotated, the drive gear 28 meshes with the driven gear 34 which in turn rotates the axle 44 and causes the pivot assembly 16 to swing out away from the wall 86 until the pressure pad 70 contacts the wall 84 of the vehicle 82. Preferably, the flat face of the pressure pad 70 will pivot as needed to rest flat against a flat interior surface of the vehicle wall 84. The pad 70 can have a cushion of rubber, foam or other compliant material to soften the engagement if desired. Preferably, the pressure pad 70 will contact the wall 84 where a structural member is located, such as a frame member of the RV stationary wall 84. The handle 35 is rotated until the pressure pad 70 is firmly seated, and preferably, until weather strips or seals 92 are compressed somewhat between the exterior flange 89 of the slide-out room and the exterior surface of the edges 91 of the slide-out room opening in the wall 84.

As stated above, a worm gear arrangement is preferred because it not only provides high gear reduction, making it easy to swing out the pivot assembly 16 and apply a compressive or clamping force against the vehicle wall 84, but also because it provides a locking feature of the worm, resisting loosening of the pivot assembly 16 and therefore automatically locking against backing out of the slide-out room. This locking feature arises because the shallow angle on the worm creates high friction forces when the worm gear tries to spin the worm. In addition, as the gaskets become compressed over time, a travel lock of the invention enables continued clamping of the room in the retracted position by just turning the handle somewhat further (than when the gaskets were new and relatively uncompressed) so as to further extend the pressure pad 70, and thereby clamp against the wall 84.

Thus, the travel stop of the present invention can be used to secure the retracted slide-out section to the vehicle, for example, to keep the slide-out section stationary with respect to the rest of the vehicle during transit. The travel stop is compact, light-weight and inexpensive. It can be mounted in a small opening in a wall of the slide-out section for access from the interior of the slide-out section. Its small size makes it inconspicuous to persons inside the slide-out section, especially with the handle removed. Its small size also makes it unnecessary to leave a large unoccupied space around the perimeter of the slide-out section. The travel stop "folds" out of the way so as not to interfere with extension of the slide-out section when desired, and can be deployed manually with a low strain cranking motion.

It should be appreciated that a preferred embodiment of the invention has been described above. However, many modifications and variations to the preferred embodiment will be apparent to those skilled in the art, which will be within the spirit and scope of the invention. For example, although not shown, two (or more) travel stops could be used to secure opposite sides of the slide-out section. Moreover, the mating gear arrangement of the actuator allows the travel stop to be easily adapted for use with an electric motor so that the pivot assembly can be deployed under power and/or automatically as part of the retraction procedure executed by the slide-out electronics. Furthermore, while a worm gear arrangement is preferred, other gear assemblies or actuator mechanisms could be utilized with other provisions made to provide the locking and reduction features. Therefore, the invention should not be limited to the described embodiment. To ascertain the full scope of the invention, the following claims should be referenced.

I claim:

1. In a vehicle having an exterior wall defining an opening for a slide-out section to move between an extended position and a retracted position and a travel lock that secures the slide-out section in the retracted position relative to the exterior wall, the travel lock comprising:
    an actuator having an operating member and being mounted to the slide-out section so that the operating member is accessible from an interior of the slide-out section for activating the actuator;
    a pivot arm mounted to the actuator and pivotal by the actuator from a collapsed position to an engaged position, wherein in the collapsed position the slide-out section can be moved from the retracted position to the extended position and wherein in the engaged position the pivot arm interferes with movement of the slide-out section from the retracted position to the extended position;
    wherein the actuator is a mating gear arrangement; and
    wherein the actuator includes a first gear coupled to the operating member and a second gear coupled to the pivot arm.

2. The travel lock of claim 1, wherein the first and second gears are worm gears.

3. The travel lock of claim 2, wherein the first gear is mounted to a shaft at one end of the operating member.

4. The travel lock of claim 3, wherein the second gear is mounted to an axle disposed essentially perpendicular to the shaft of the operating member.

5. The travel lock of claim 4, wherein the gear ratio is about 30 to 1.

6. The travel lock of claim 5, wherein the pitch diameter of the first gear is about 0.5 inches and the pitch diameter of the second gear is about 1.25 inches.

7. The travel lock of claim 1, further comprising a gear box containing the first and second gears and defining an opening for coupling the operating member to the first gear and an opening for coupling the pivot arm to the second gear.

8. In a vehicle having an exterior wall defining an opening for a slide-out section to move between an extended position and a retracted position and a travel lock that secures the slide-out section in the retracted position relative to the exterior wall, the travel lock comprising:
    a mating gear mechanism mounted to the slide-out section having a first gear engaging a second gear; and
    a pivot arm mounted to the second gear and being pivotal by relative rotation of the first gear with respect to the second gear from a collapsed position to an engaged position;
    wherein in the collapsed position the slide-out section can be moved from the retracted to the extended position and wherein in the engaged position the pivot arm interferes with movement of the slide-out section from the retracted to the extended position.

9. The travel lock of claim 8, wherein the first and second gears are worm gears.

10. The travel lock of claim 8, further comprising an operating member for imparting rotation to the first gear.

11. The travel lock of claim 10, further including a handle for turning the operating member.

12. The travel lock of claim 10, wherein the first gear is mounted to a shaft at one end of the operating member and wherein the second gear is mounted to an axle disposed essentially perpendicular to the shaft of the operating member.

13. The travel lock of claim 8, further including a second pivot arm parallel with the pivot arm.

14. The travel lock of claim 8, further including a pressure pad at a free end of the pivot arm.

15. The travel lock of claim 14, wherein the pressure pad is pivotal with respect to the pivot arm.

16. The travel lock of claim 8, further including a gear box containing the mating gear mechanism.

17. The travel lock of claim 8, further including a handle for rotating the operating member.

* * * * *